2,815,291
CERAMIC CONDENSER DIELECTRIC

Alvin L. Rogatz, Oak Park, Ill., assignor to Zenith Radio Corporation, a corporation of Illinois No Drawing. Application September 6, 1955, Serial No. 532,791

2 Claims. (Cl. 106—39)

This invention relates to vitrified ceramic materials and more particularly to ceramic condenser dielectrics which provide a low temperature coefficient of capacity throughout a wide temperature range.

Many commercial applications require miniature capacitors capable of withstanding extremes of temperature while maintaining a nearly constant capacity throughout the temperature range. For example, an aircraft rising from ground level to high altitudes is exposed to a wide range of temperatures. Military vehicles, which may be shipped through thousands of miles from one climatic zone to an area having an entirely different climate, also are exposed to wide temperature variations. It is desirable that components of communications equipment mounted in such machines be capable of exposure to wide temperature ranges while maintaining nearly constant electrical values.

It is an object of the invention to provide a new and improved condenser dielectric having a low temperature coefficient of capacity throughout a wide temperature range.

The improved condenser dielectric of the invention comprises as the sole major constituents non-stoichiometric barium titanate, having an excess of barium oxide, in an amount from 50 to 95 percent by weight, and the balance one or more appropriate dielectric fillers from the group composed of alkaline earth zirconates, stannates and titanates. Of course, appropriate flux materials may be employed in small amounts. When fired to vitrification, a low temperature coefficient of capacity and a high dielectric constant is achieved.

The features of the invention which are believed to be novel are set forth with particularity in the appended claims. The invention, together with further objects and advantages thereof, may more readily be understood by reference to the following description.

The present invention provides a vitrified ceramic material which consists essentially of non-stoichiometric barium titanate and one or more standard dielectric fillers from the group composed of alkaline earth zirconates, stannates, and titanates. The resulting ceramic piece exhibits a high dielectric constant, facilitating the construction of a miniature capacitor. The piece has a very low temperature coefficient of capacity over a wide temperature range, and is useful as a precision component in communications equipment designed to operate efficiently despite exposure to a wide range of temperatures. By way of illustration the following process may be employed to produce a vitrified ceramic piece suitable for use as such a capacitor; the various steps in the process are not considered as limitations except where alternative methods are specifically excluded.

Commercial grades of barium titanate and barium oxide are mixed together and calcined to give a non-stoichiometric barium titanate mixture having an excess of barium oxide. In a preferred embodiment, barium oxide in the amount of six percent by weight of the mixture of the two compounds is added to the barium titanate before calcining. Preferably the calcination is accomplished by heating the mixture to a temperature of 2000° F., and maintaining this temperature for one hour. After calcination the material is ground to produce a particle size that enables the material to be mixed readily with other dielectric fillers; such a particle size may be, for example, of the order of 200 mesh, depending in part on the forming procedures and equipment employed and the final shape of the piece, as is well known in the art.

The non-stoichiometric barium titanate is mixed with one or more standard dielectric fillers from the group composed of alkaline earth zirconates, stannates, and titanates. Of course, the fillers in this category cannot be used indiscriminately, as the compounds of higher molecular weights (e. g., barium zirconate) lead to a highly refractory mixture as is well known in the art; however, the heavier fillers may be used sparingly and mixed with lighter materials of the same class (e. g., magnesium stannate) to achieve practical firing temperatures. The percentage by weight of dielectric filler affects the temperature coefficient of the resultant piece. In the preferred embodiment, there is formed a mixture comprising 83.35 percent by weight of non-stoichiometric barium titanate containing an excess of barium oxide in the amount of 6% by weight of the non-stoichiometric barium titanate, and 16.65 percent by weight of the following filler materials and fluxes:

| Filler material: | Percent by weight |
|---|---|
| Calcium titanate | 8.4 |
| Strontium titanate | 2.9 |
| Magnesium zirconate | 2.3 |
| Fluxes: | |
| Barium zirconium silicate | 1.9 |
| Nickel stannate | 1.0 |
| Ferric oxide | 0.15 |

A ceramic piece produced from this mixture produces a low temperature coefficient of capacity over a wide temperature range. To the mixture of non-stoichiometric barium titanate and dielectric filler may be added an organic binder material, such as polyvinyl alcohol. The resultant material is mixed and dried, and then granulated. The mixture is pressed into any desired shape by methods well known in the art and fired to vitrification; for the illustrative composition, the firing is preferably carried out at 2550° F. for one hour.

The resulting ceramic piece exhibits a temperature coefficient of capacity of plus or minus five percent from −55 degrees C. to +73 degrees C. and has a dielectric constant of 1300. Such a piece is eminently suited to serve as a precision capacitor throughout a wide temperature range.

When producing the non-stoichiometric barium titanate, excess barium oxide in an amount of at least one percent by weight is added; this insures that the resultant barium titanate contains an excess of barium oxide, which is required to obtain the low temperature coefficient exhibited by the invention. If more than ten percent by weight of excess barium oxide is added, the mixture is highly refractory and the firing of the dielectric piece is more difficult. After the non-stoichiometric barium titanate has been produced, it is mixed with one or more of the standard dielectric fillers. When the resultant mixture contains from 50% to 95% by weight of non-stoichiometric barium titanate having an excess of barium oxide, a piece exhibiting a high dielectric constant and a low temperature coefficient of capacity throughout a wide range of temperatures can be produced. Ceramic dielectrics of this type which are easily formed and which permit firing at economically feasible temperatures can be achieved by using from 75 to 95 percent of non-stoichiometric barium titanate, having an excess of barium oxide of from one to ten percent by weight of the non-stoichiometric barium titanate, and adding appropriate dielectric fillers in the amount of from 5 to 25 percent by weight of the mixture.

While a particular process for preparing ceramic pieces in accordance with the present invention has been set forth, it is to be understood that this process is merely illustrative. Certain departures from the procedures set forth may be made with no substantial effect on the properties of the resulting ceramic material. It is also to be noted that certain variations in the individual steps in the process may be required when it is desired to produce pieces of specific size and shape; such variations will occur to those skilled in the art.

The use of the phrase "comprising as the sole major constituents" in the appended claims is not intended to exclude small amounts of impurities or of flux materials in an amount of the order of four percent by weight or less; impurities, in varying amounts, are always present, and the use of various fluxes is well known and understood.

I claim:

1. A ceramic dielectric material comprising as the sole major constituents non-stoichiometric barium titanate, having an excess of barium oxide in the amount of one to ten percent by weight of said non-stoichiometric barium titanate, in the amount of 83.35% by weight, calcium titanate in the amount of 8.4% by weight, strontium titanate in the amount of 2.9% by weight, and magnesium zirconate in the amount of 2.3% by weight.

2. A ceramic dielectric material consisting essentially of non-stoichiometric barium titanate, having an excess of barium oxide in the amount of six percent by weight of said non-stoichiometric barium titanate, in the amount of 83.35% by weight, calcium titanate in the amount of 8.4% by weight, strontium titanate in the amount of 2.9% by weight, magnesium zirconate in the amount of 2.3% by weight, and the remainder flux.

References Cited in the file of this patent

UNITED STATES PATENTS

| | | |
|---|---|---|
| 2,467,169 | Wainer | Apr. 12, 1949 |
| 2,563,307 | Burnham et al. | Aug. 7, 1951 |